Aug. 1, 1967 W. J. SCHLAPMAN 3,333,810
BATTERY HOLDDOWN CLAMP
Filed Jan. 26, 1966
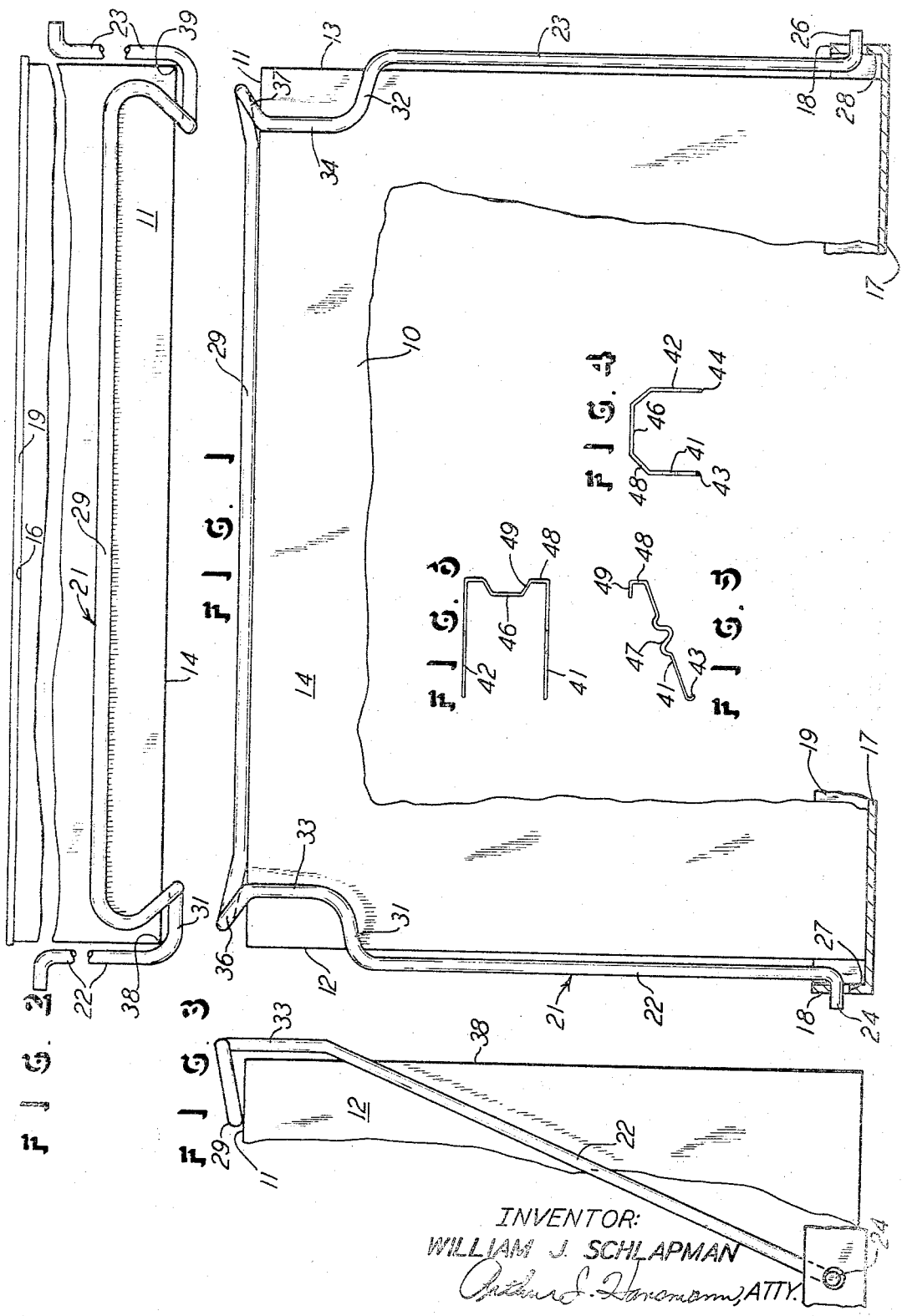
INVENTOR:
WILLIAM J. SCHLAPMAN Patented Aug. 1, 1967

3,333,810
BATTERY HOLDDOWN CLAMP

William J. Schlapman, Winneconne, Wis., assignor to Colt Manufacturing Company, Inc., Winneconne, Wis., a corporation of Wisconsin
Filed Jan. 26, 1966, Ser. No. 523,188
6 Claims. (Cl. 248—361)

This invention relates to a battery holddown clamp for use on vehicles.

Many constructions for battery holddown clamps are already known. These include a number of arrangements where threaded members are employed, such as bolts and wing nuts, for clamping the battery to the vehicle so that of course the battery does not slide with respect to the vehicle and so that it can be removed as desired. However, these known constructions are generally arranged in a plurality of parts, which frequently must be interconnected, and they are cumbersome, expensive, difficult to manipulate, frequently hold the battery in only one or two directions, are expensive, and for other reasons are not the desired answer to the problem.

It is a general object of this invention to provide a battery holddown clamp which is an improvement upon those heretofore known and which overcomes the problem of the type mentioned above.

More specifically, the objects of this invention include the provision of a battery holddown clamp which can be made from a single piece of rod material, which is inexpensive, which holds the battery against movement in all directions when the battery is disposed on a shelf on the vehicle, which accommodates itself to variations in battery dimensions and even to different size batteries, and it has not parts which are subject to being misplaced or otherwise lost when the battery is being replaced.

Still a further object of this invention is to provide a battery holddown clamp which eliminates the use of any relatively movable parts, such as cams, nuts, and the like for clamping onto the battery, but which nevertheless is an improvement in battery clamps for vehicles in that it is easy to secure and release the battery. In fact, the clamp of this invention need only be pulled off the battery or placed onto the battery, both in one movement away and toward the battery, respectively, in order to remove or release the battery and subsequently secure the battery.

Still another specific object of this invention is to provide a battery clamp which holds the battery against movement in the five orthogonal directions, while being of only a single piece of rod. Thus the battery cannot move to either side, nor to either end, nor can it move up off the shelf on which it is disposed on the vehicle.

Other objects and advantages become apparent upon reading the following description in light of the accompanying drawings, wherein:

FIG. 1 is an end elevational view of a battery clamp of this invention and showing it applied to a battery with the central portion thereof broken away.

FIG. 2 is a top plan view of FIG. 1 with the central fragment thereof broken away.

FIG. 3 is an end elevational view of FIG. 1 with the end fragment thereof broken away.

FIG. 4 is a front elevational view of a portion of the apparatus for securing a battery and showing an embodiment thereof different from FIG. 1.

FIG. 5 is a side elevational view of FIG. 4.

FIG. 6 is a top plan view of FIG. 5.

The embodiments shown in FIGS. 1, 2, and 3, show a conventional battery 10 having a top 11, two opposite sides 12 and 13 and an end wall designated 14 and an opposite end or fourth side designated 16. The battery is shown to be resting upon a support or shelf 17 which of course would be secured in a fixed position on a vehicle, such as a tractor or the like. Of course the purpose of the invention is to anchor or secure the battery 10 in a fixed position with respect to the shelf 17 so that the battery will not move with respect to the shelf 17. It is of course common to provide a shelf, such as the shelf 17, and to also have upturned edges on the shelf 17, such as the side edges 18 and the end edge 19, as shown between FIGS. 1 and 2. Thus FIG. 2 shows that the battery end 16 is in abutment with the shelf end 19 which thus provides an abutment or a stop for the battery 10 in the direction of the upturned edge 19.

The apparatus of this invention also includes a single continuous piece of rod, generally designated 21. The rod 21 is made of a flexible material such as metal wire material of a number 10 gauge having a diameter of .135 inch and being hard drawn in the forming process. It has therefore been found that this type of rod material will serve the purpose intended, and will perform the functions of resiliency and yet secure the battery as hereinafter described. The rod 21 has a general U-shape, which is of course shown inverted in FIG. 1, and includes the two legs 22 and 23 and the out-turned ends 24 and 26. The ends 24 and 26 are slidably and thus releasably received in openings 27 and 28, respectively, in the up-turned edges 18 of the supporting shelf 17. Actually, the rod 21 is formed also with a cross-piece 29 which is slightly naturally sprung so that the legs 22 and 23 tend to move away from each other and thereby remain secure in the openings 27 and 28 even when the battery 10 is removed.

The drawings show that the cross-portion 29 is offset from the plane of the legs 22 and 23 toward the side of the pivotal connection formed by the ends 24 and 26 extending through the shelf openings 27 and 28. Of course the cross-portion 29 thus bears down upon the battery top 11 to hold the battery down, and it does so by a bending type of tension or force placed in the piece 21 because of the offset described. Further, it can already be recognized that the piece 21 can be applied to a battery of different dimensions from the one shown relative to the dimensions of the piece 21 itself. That is, if the battery 10 were of slightly different dimensions due to manufacturing tolerances, the piece 21 would readily adapt to it, and, further, the piece 21 would even adapt to a battery of say a longer length or a greater height than the one shown in relation to the dimension of the clamp 21.

In order to hold the battery 10 against both what may be termed sidewise movement, that is toward either side 12 or 13, and additional sidewise or what may be termed endwise movement, that is toward the side or end 14, the piece 21 is formed with a length extending between the respective legs 21 and 22 and the cross-portion 29 in a compound curvature as shown. This compound curvature includes the first inturned portions designated 31 and 32 and the continuing upwardly extending portions designated 33 and 34 and the upwardly and outwardly turned portions designated 36 and 37. These respective portions are of course on the legs 22 and 23 respectively. FIG. 2 therefore particularly shows that the portions 31 and 32 extend along the battery side 14, and they actually engage the battery corners 38 and 39 respectively.

Thus it will now appear that the battery is secured against the movement to either side as well as against movement toward the end, as mentioned.

The embodiment in FIGS. 4, 5, and 6, also shows the battery with the two legs 41 and 42 and the end hooks 43 and 44 on the cross-portion 46. The legs 41 and 42 have a serpentine portion designated 47. Also, the legs and the cross portion are connected by a first length 48 and a second length 49 which form the complete extent across the corners of the U-shape between the respective legs and the cross-portion 46.

Thus, again, the portion 48 would abut the battery corner, and of course each of the battery corners 38 and 39 would have the respective portion 48 securing it, and the cross-portion 46 would be across the top of the battery to secure it downwardly. In this embodiment, the tension is placed downwardly on the battery by means of the serpentine shaped length 46 which can be somewhat tensioned within the limits of the rod material. The hooks 43 and 44 may be turned downwardly as shown in FIG. 5 instead of outwardly like hooks 24 and 26 in FIG. 1. Then the shelf 17 would have openings in it, rather than in the sides 18, for pivotally receiving the hooks 43 and 44.

While two embodiments of this invention have been shown and described, it should be obvious that certain changes could be made in the embodiments and the invention should therefore be determined only by the scope of the appended claims.

What is claimed is:

1. Apparatus for securing to a vehicle a substantially cubically-shaped battery having a top and two opposite sides and an end wall between said sides, comprising a shelf upon which a battery can be supported, a U-shaped rod of a single piece of flexible material forming two legs and an intermediate cross-portion and with said two legs thereof extending along said two opposite sides of the battery and being pivotally connected to said shelf and restrained thereby in the direction away from said shelf along said legs, said rod being shaped to have said cross-portion disposed offset from the plane on which said legs lie and to be disposed in abutment with said top of the battery and to be resiliently tensioned downwardly on the battery, and with the two lengths of said rod between each of said two legs and said cross-portion being disposed to extend over said end wall of said battery and have said legs under tension to secure the battery against movement.

2. The subject matter of claim 1, wherein said shelf includes an abutment disposed to the side of the battery opposite said end wall for presenting a stop to the battery and restrain it from moving beyond said abutment and against the urging of said legs under tension.

3. The subject matter of claim 1, wherein said two lengths are corners respectively extending between said two legs and said cross-portion and are compound curvatures extending first inwardly toward each other from said legs, to be disposed in respective abutment with the two corners of the battery formed by said two opposite sides and said end wall, and with said curvatures then extending upwardly toward said cross-portion.

4. The subject matter of claim 1, wherein said cross-portion is arranged in its flexible characteristic to yieldingly urge said two legs apart against their pivotal connections with said shelf for maintaining said rod on said shelf when said rod is free of said battery.

5. The subject matter of claim 1, wherein said two legs have lengths which are a serpentine shape for creating bending forces in said lengths in resiliently urging said cross-portion downwardly on said battery.

6. The subject matter of claim 1, wherein said cross-portion is offset from the said two legs to the side of the plane of said two legs toward the pivotal connection of said two legs with said shelf.

References Cited

UNITED STATES PATENTS

| 2,480,202 | 8/1949 | Stassen | 180—68.5 |
| 2,833,363 | 5/1958 | Henehan | 248—361 X |

FOREIGN PATENTS

| 1,181,267 | 1/1959 | France. |
| 935,565 | 8/1963 | Great Britain. |

ROY D. FRAZIER, *Primary Examiner.*

F. DOMOTOR, *Assistant Examiner.*